(12) United States Patent  
Sahita (10) Patent No.: US 7,548,944 B2  
(45) Date of Patent: Jun. 16, 2009

(54) STATISTICS COLLECTION FRAMEWORK FOR A NETWORK PROCESSOR

(75) Inventor: Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 10/620,488

(22) Filed: Jul. 15, 2003

(65) Prior Publication Data

US 2005/0013293 A1 Jan. 20, 2005

(51) Int. Cl.
*G06F 15/173* (2006.01)
(52) U.S. Cl. ..................... 709/200
(58) Field of Classification Search ............... 709/200, 709/213, 224
See application file for complete search history.

(56) References Cited

U.S. PATENT DOCUMENTS 6,212,542 B1 * 4/2001 Kahle et al. ............... 718/102
6,714,985 B1 * 3/2004 Malagrino et al. .......... 709/236
6,892,237 B1 * 5/2005 Gai et al. .................... 709/224
7,089,352 B2 * 8/2006 Regev et al. ................ 711/108

OTHER PUBLICATIONS

*Intel® IXP1200 Network Processor Datasheet;* Intel Corporation, Dec. 2001, pp. 9-144.
*Management Information Base for Network Management of TCP/IP-based internets: MIB-II;* K. McCloghrie and M. Rose Editors, Network Working Group, Mar. 1991, pp. 1-66.

\* cited by examiner

*Primary Examiner*—David Y Eng
(74) *Attorney, Agent, or Firm*—Marger, Johnson & McCollom, P.C.

(57) ABSTRACT

Methods and devices for wire-speed packet statistics collection in a network processor are disclosed. A control-plane process maintains a dynamic packet rule set, each rule specifying a packet offset, a data pattern to be found at that offset, and an action to be taken if that data pattern is found. One or more packet processing engines process the packet rule set for incoming packets and take actions such as updating counters in a counter table when a rule evaluates true. The control-plane process can access the counter table to monitor which rules are triggered by packet traffic with what frequency.

23 Claims, 8 Drawing Sheets

| RULE | PACKET OFFSET | DATA PATTERN | ACTION CODE |
|---|---|---|---|
| 00 | | | UPDATE TABLE [OFF0] |
| 01 | | | UPDATE TABLE [OFF1] |
| 02 | | | MULTIPART; UPDATE TABLE [OFF2] |
| 03 | | | MULTIPART; UPDATE TABLE [OFF3] |
| 04 | | | UPDATE TABLE [OFF4] |
| 05 | | | INVALID; EOL |

STATISTICS COLLECTION FRAMEWORK FOR A NETWORK PROCESSOR

FIELD OF THE INVENTION

This present invention relates generally to network processors, and more particularly to hardware, cooperating software, and methods for statistics collection for packets processed by a network processor.

BACKGROUND

Packet-based networks transmit information from a source to a destination using finite-length datagrams, each comprising one or more nested headers and a data payload. For instance, a packet requested by the destination's web browser, for source and destination computers on the same "Ethernet" local network, could contain at each point on its journey (viewed from the head of the packet): an "Ethernet" header, specifying the immediate frame destination; an Internet Protocol (IP) header, specifying the IP addresses of the source and ultimate destination; a Transport Control Protocol (TCP) header, specifying a pre-existing TCP connection between the source and destination, and a HyperText Transfer Protocol (HTTP) header with an attached HTTP payload. Each nested header must conform to its corresponding protocol if the source expects the packet to pass through the network to the destination in a normal fashion.

A typical network-processing device handles packets with many, many different protocols, although a device may not process higher-level (i.e., more deeply nested) protocols when the device merely forwards the packet. Errors in protocol implementations sometimes introduce weak points in an otherwise sound specification. These errors can cause failure during packet transport, and therefore failure of services using that protocol. Also, malicious entities may attempt to misuse protocol features to degrade the performance of—or even bring down—a network processing device or network segment. As node throughput increases, and network processing devices move to distributed-processing architectures to cope with higher throughput, it becomes more and more difficult to monitor, detect, and respond to inadvertent or malicious traffic anomalies for traffic passing through a node.

BRIEF DESCRIPTION OF THE DRAWINGS

The embodiments may be best understood by reading the disclosure with reference to the drawings, wherein.

DETAILED DESCRIPTION OF THE EMBODIMENTS

This description details a packet statistics collection approach for network processors. In general, this approach may result in: dynamic statistical collection capability, i.e., the selected statistics can be changed as the processor runs; partitioning of statistics gathering into a relatively simple, high-speed packet examination process that can be implemented at wire speed on a packet processing engine, and more complex low-speed processes for controlling what statistics are gathered, and reporting those statistics; and protocol-independence, i.e., a framework that does not require header processing, which both allows for a wire-speed implementation and allows statistics to be gathered for packets which do not conform to their respective protocol specifications.

The use made of gathered statistics is not critical to the present invention, but to provide context, some possible uses are baselining "normal" traffic behavior, gathering current traffic behavior for comparison to "normal" behavior, load balancing, verifying adherence to a service level agreement, providing bandwidth on demand, and traffic engineering.

Figure 1:
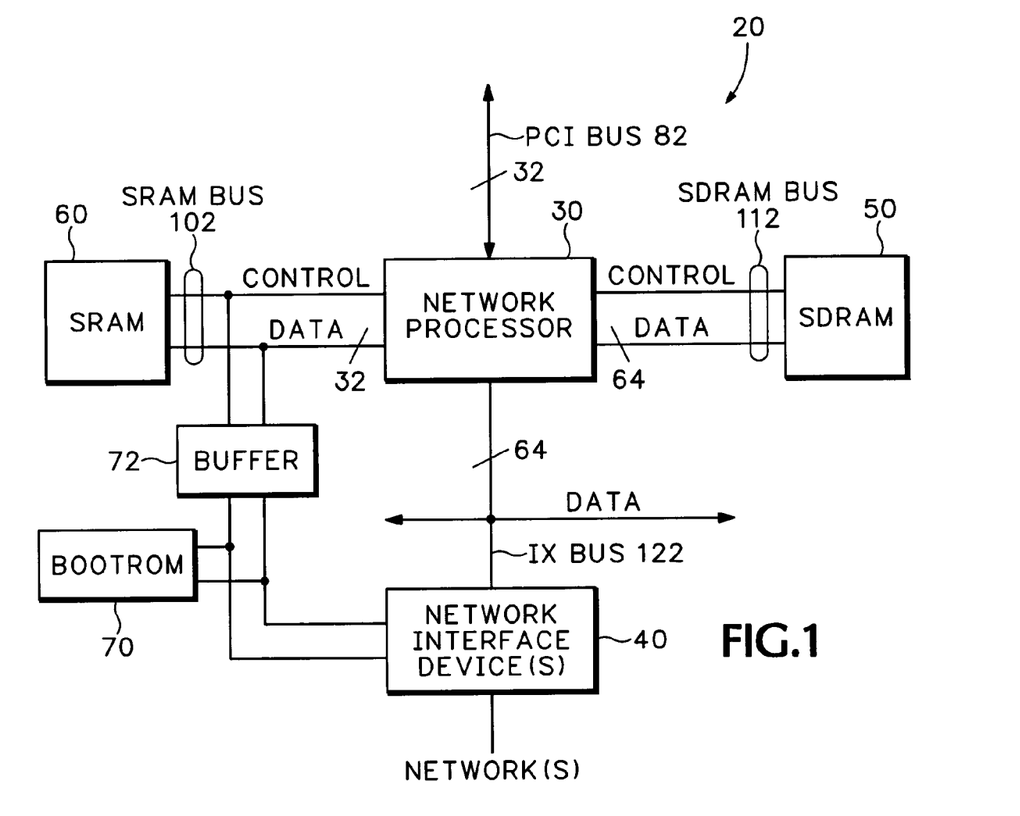
FIG. 1 illustrates a system employing a network processor capable of operating according to an embodiment of the invention.

FIG. 1 shows an exemplary system 20, employing a network processor 30, capable of supporting an embodiment of the invention. System 20 could be, e.g., a router, gateway, firewall, switch, bridge, or traffic aggregation point, depending on its programming and the type(s) of network interface device(s) 40 that it connects.

The heart of system 20 is network processor 30. Network processor 30 in this embodiment can be, for example, an Intel® IXP1200-series or IXP2400-series network processor, manufactured by Intel Corporation, although the concepts described herein are believed to be readily adaptable to network processors offered by other manufacturers. The internal structure of an exemplary network processor 30 will be described in conjunction with the presentation of FIG. 2.

Network processor 30 communicates with other system components over four buses: a 32-bit-wide PCI (Peripheral Component Interconnect) bus 82; a 32-bit-wide (data) SRAM (Static Random Access Memory) bus 102; a 64-bit-wide (data) SDRAM (Synchronous Dynamic Random-Access Memory) bus 112; and a 64-bit-wide reconfigurable "IX" Bus 122 supporting media connections. PCI bus 82 may be used, for example, to connect network processor 30 to a system host processor and/or PCI peripherals (not shown). SRAM bus 102 connects network processor 30 to an SRAM 60, which is used, for example, to store lookup tables and other information needed during packet processing. A buffer 72 also connects SRAM bus 102 to a bootROM 70, used to initialize system 20, and to a control port on network interface devices 40. SDRAM bus 112 connects network processor 30 to an SDRAM 50, which is used, for example, to temporarily store packets/cells during processing and forwarding tables. IX bus 122 connects network processor 30 to one or more network interface devices 40, and can also be used to connect a second network processor (not shown) to the system.

Figure 2:
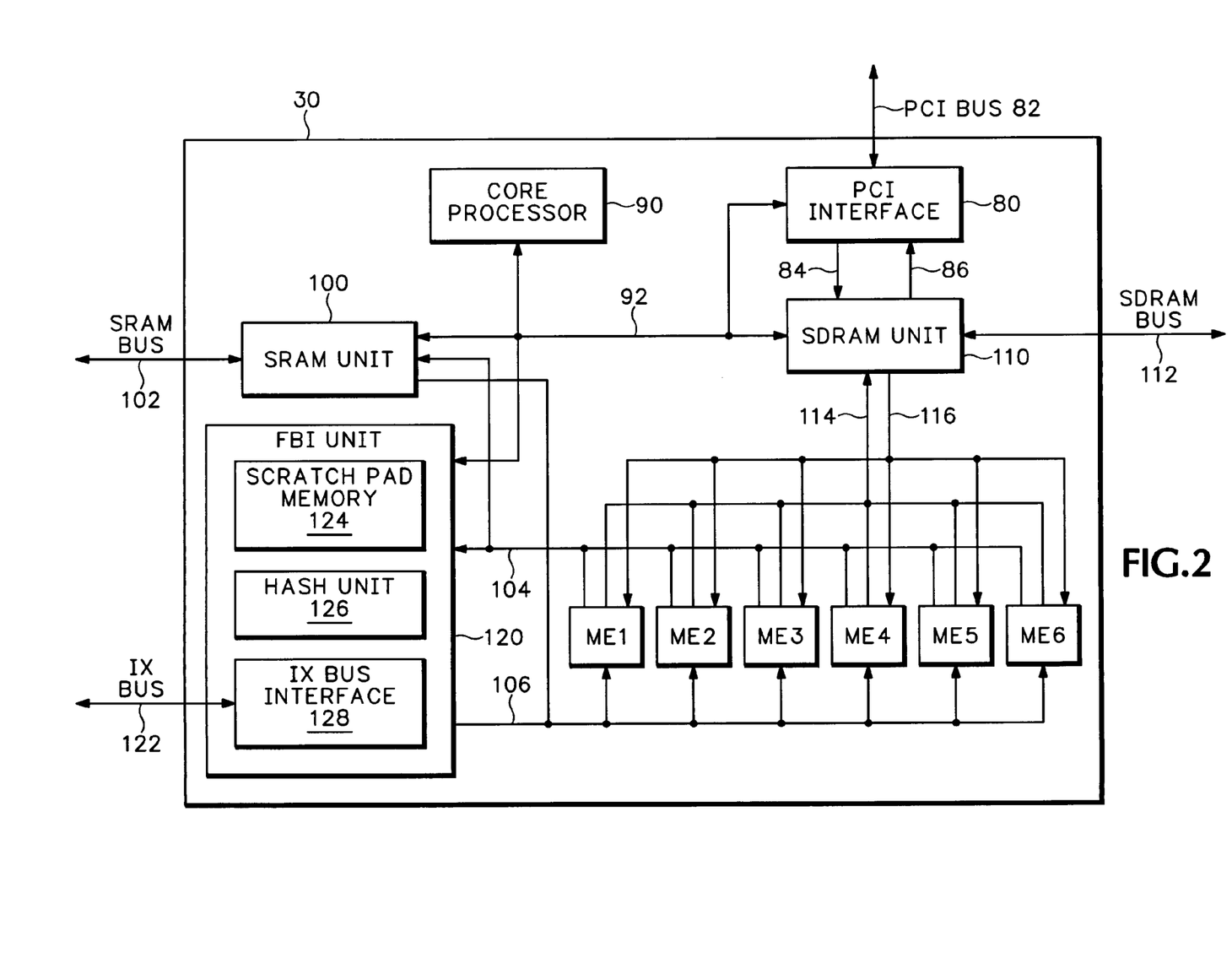
FIG. 2 shows a block diagram for one network processor capable of operating according to an embodiment of the invention.

FIG. 2 shows a high-level block diagram for network processor 30, representative of an Intel® IXP12xx network processor, manufactured by Intel Corporation. A core processor 90 provides traditional microprocessor functionality. Six microengines ME1 to ME6 function as packet processing engines. An SRAM unit 100, an SDRAM unit 110, and a FBI (Fast Bus Interface) unit 120 provide external interface services respectively to SRAM bus 102, SDRAM bus 112, and IX bus 122. A PCI interface 80 provides PCI connectivity for network processor 30.

A plurality of 32-bit data buses cross-connect the blocks of network processor 30. Core processor 90 connects to PCI interface 80, SRAM unit 100, SDRAM unit, and FBI unit 120 through a data bus 92. Data buses 104 and 106 connect the microengines (ME1 through ME6) to SRAM unit 100 and FBI unit 120. Data buses 114 and 116 connect the microengines to SDRAM unit 110. Data buses 84 and 86 connect PCI interface 80 directly to SDRAM unit 110.

SRAM unit 100 and SDRAM unit 110 queue and arbitrate memory access requests generated by core processor 90, the microengines, and PCI interface 80 (SDRAM unit 110 only). SRAM unit 100 and SDRAM unit 110 can process burst requests for up to eight consecutive 32-bit words.

FBI unit 120 comprises an on-chip scratchpad memory 124, a hash unit 126 to generate hash keys, and an IX bus interface 128. IX Bus interface 128 contains receivers and drivers and receive and transmit FIFO registers for IX bus 122.

Figure 3:
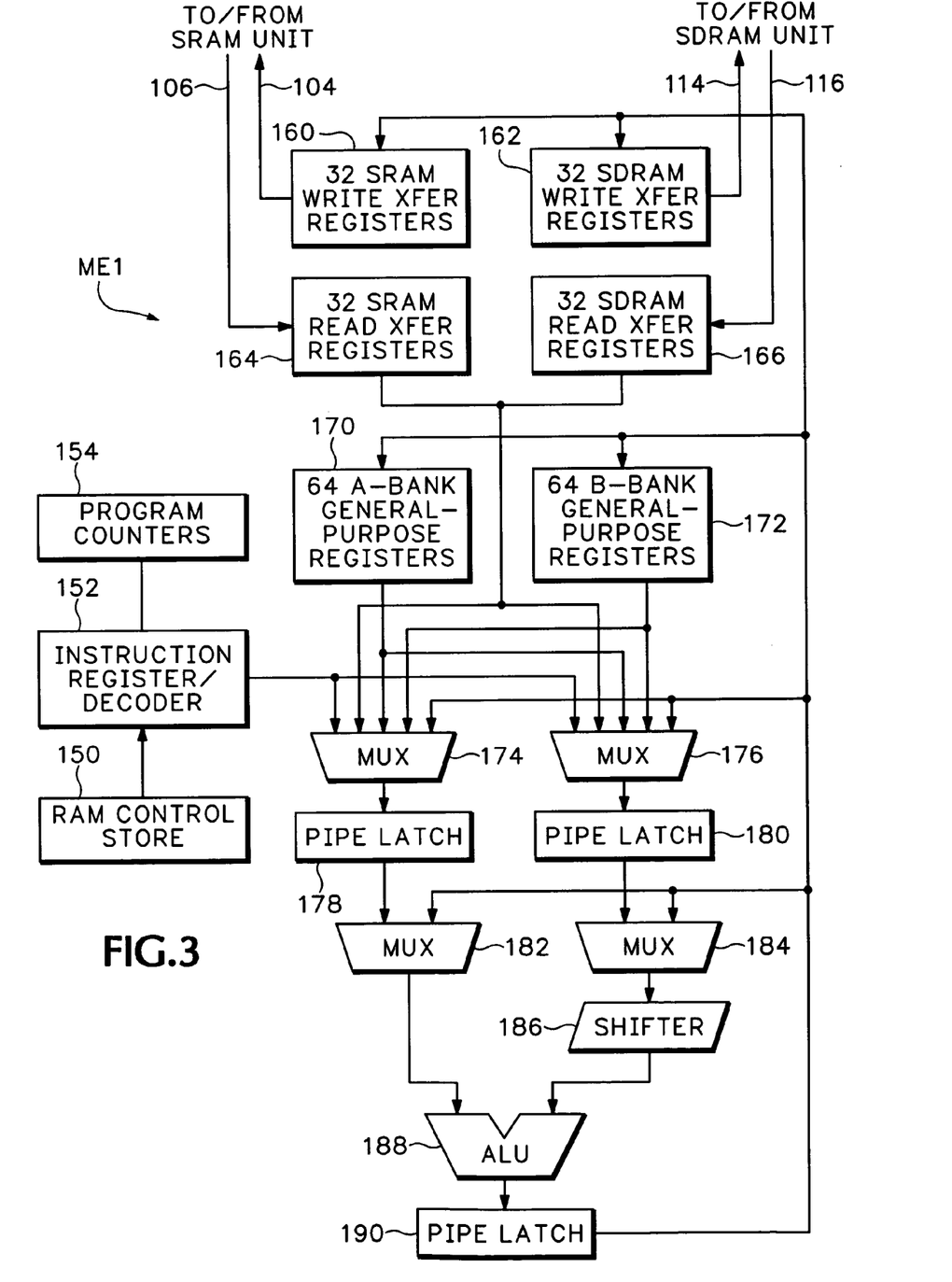
FIG. 3 shows a block diagram for a packet processing engine useful with an embodiment of the invention.

FIG. 3 shows a block diagram for one of the microengines. Each microengine has several features that contribute to high throughput, some of which are exploited in the described embodiments. A dedicated RAM control store 150 contains instructions for that microengine. Each microengine is multi-threaded, i.e., an instruction register/decoder 152 maintains four program counters 154 for four separate execution threads, and can switch context between these threads with no overhead, for instance when the current thread is waiting on a memory transfer.

Four separate memory transfer register sets are provided, i.e., a write transfer register set 160 and a read transfer register set 164 for the SRAM data buses 104 and 106, respectively, and a separate write transfer register set 162 and read transfer register set 166 for the SDRAM unit. Each memory transfer register set comprises 32 32-bit registers, which can be partitioned into four thread-addressable eight-register groups, one group per thread. A and B banks of General Purpose Registers (GPRs) 170 and 172, each having 64 32-bit registers, also can be partitioned, into four 16-register groups each.

Two multiplexers 174 and 176 feed operands, respectively, to two ALU (Arithmetic Logic Unit) pipe latches 178 and 180, each multiplexer selecting data either from a memory read transfer register input, an A-bank or B-bank GPR input, immediate data from the instruction register/decoder, or return data from an ALU output pipe latch 190. Multiplexer 182 selects data either from pipe latch 178 or pipe latch 190 as one operand to an ALU 188. Multiplexer 184 selects data either from pipe latch 180 or pipe latch 190 as a second operand to ALU 188, through a shifter 186. Shifter 186 and ALU 188 operate together to produce a result in a single clock cycle.

Figure 4:
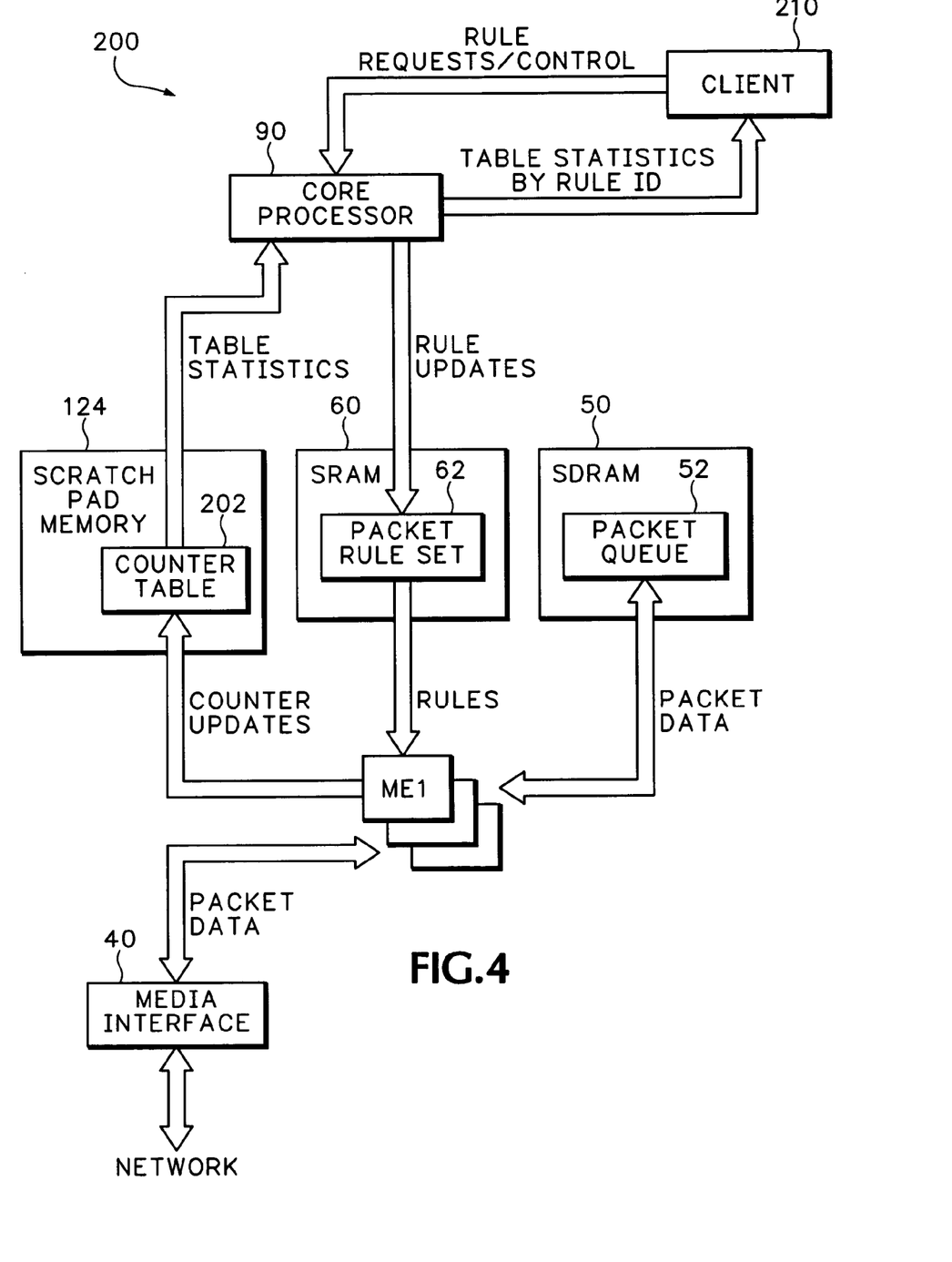
FIG. 4 contains a functional block diagram, illustrating rule processing data paths used in an embodiment of the invention.

FIG. 4 contains a functional block diagram for a statistic collection process according to one embodiment of the invention, using the hardware as described in the preceding figures. Conceptually, this process is based on a framework of packet rules, as will be explained in further detail. A packet rule set 62 is constructed and written to SRAM 60. Area for a counter table 202 is allocated within scratchpad memory 124. When the processor is using a store-and-forward model, received packets will be stored in a packet queue 52 on SDRAM 50 until they are forwarded towards their destination.

A client 210 communicates with core processor 90 of a network processor, i.e., using the network processor's local PCI interface, or the network interface for a remote statistics client. Client 210 passes rule requests and control requests (e.g., rule disable, statistics reset, or collect statistics requests) to core processor 90.

Core processor 90 responds to client requests. When core processor 90 receives a rule request or a control request that affects the packet rules, it updates packet rule set 62 stored on SRAM 60. When core processor 90 receives a collect statistics request, or has been configured to auto-collect statistics at periodic intervals, core processor 90 reads counter table 202 from scratchpad memory 124, and reports counter table values to client 210 in a format understandable to the client.

One or more of the packet processing engines execute statistics collection threads while processing packets in packet queue 52. A statistics collection thread loads packet rules from packet rule set 62, examines packet data as specified in each rule, and performs table updates to counter table 202 based on the result of rule processing.

Figure 5:
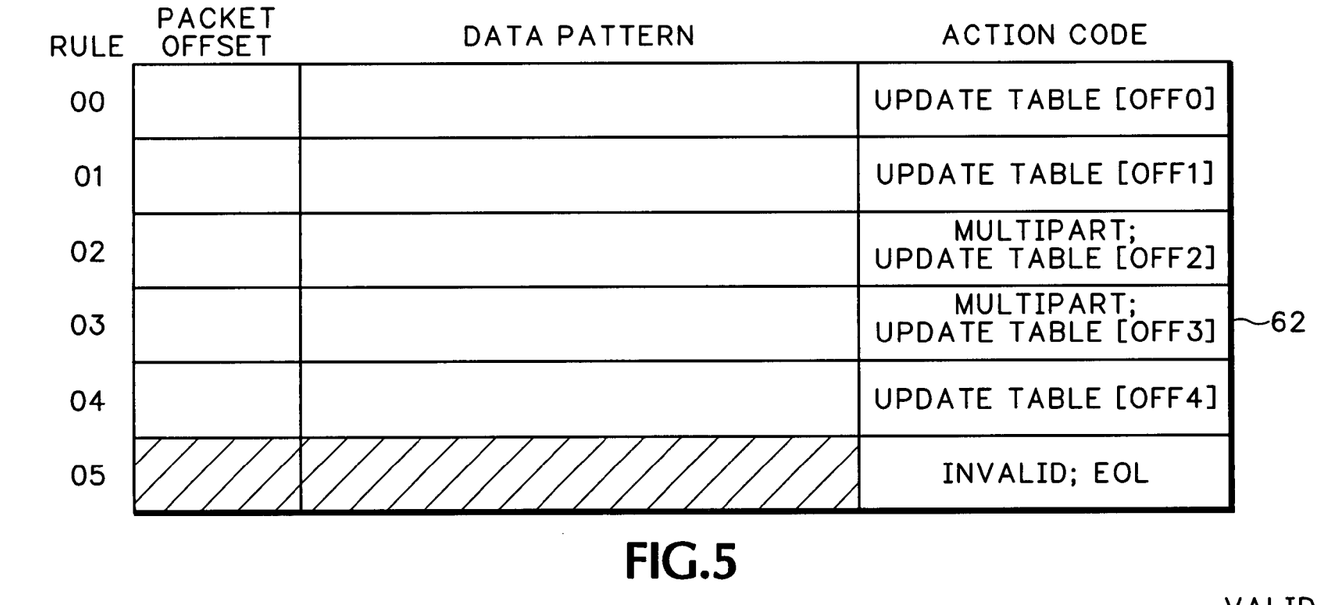
FIG. 5 shows one format for a packet rule set useful in some embodiments of the invention.

FIG. 5 shows an exemplary packet rule set 62, with six rules (00 to 05). Each rule in packet rule set 62 specifies a packet offset, a data pattern, and an action code. The data pattern for each rule specifies a data segment that is to be compared to each incoming packet. The packet offset for each rule specifies the starting packet octet for the packet segment where the data pattern is expected to appear. The action code specifies an action to be performed when the data pattern matches the data found at the specified offset of a packet.

In one embodiment, each action code contains an offset into counter table 202 (FIG. 4). Thus when rule 00 evaluates true, the counter table location indexed by OFF0 is incremented, when rule 01 evaluates true the counter table location indexed by OFF1 is incremented, etc.

Action codes may contain instructions other than table increments. For instance, rule 05 has an invalid code and an EOL (End Of List) code. The invalid code signifies that rule 05 is not currently active. The EOL code signifies that this is the last rule in the list. Rules 01 and 02 contain a "multipart" code, signifying that rule 02 cannot evaluate true unless rule 01 evaluated true, and rule 03 cannot evaluate true unless rule 02 evaluated true. The multipart code can therefore by used to link two rules to form a more complex rule. Rules 01 and 02 are shown with table increment action codes, although in some implementations a table increment operation could be optional.

Figure 6:
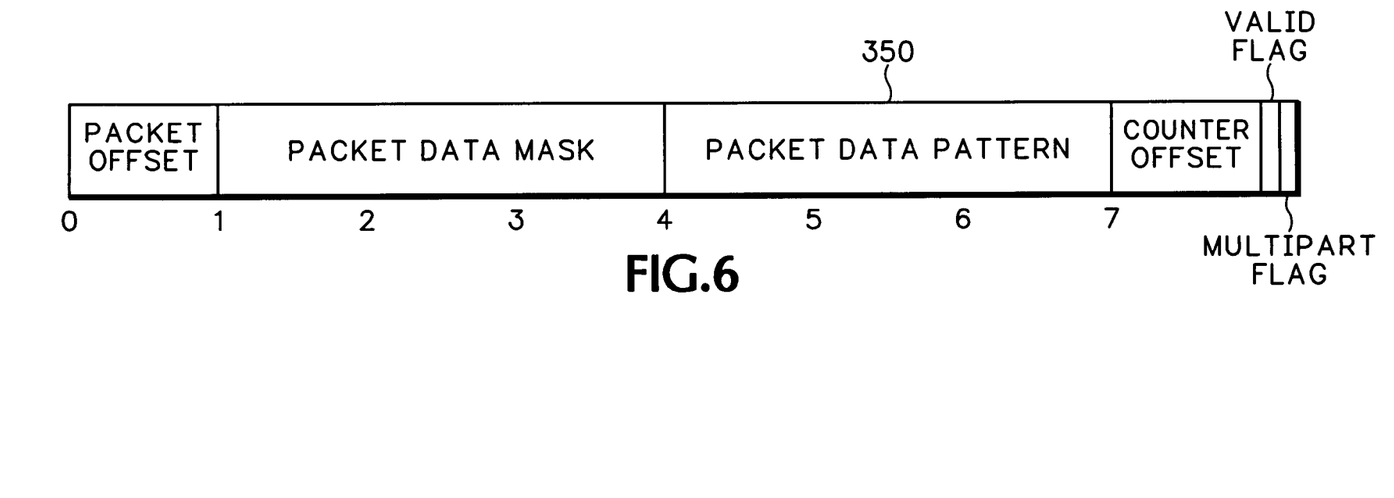
FIG. 6 shows a more detailed format for a packet rule set useful in some embodiments of the invention.
Figure 7:
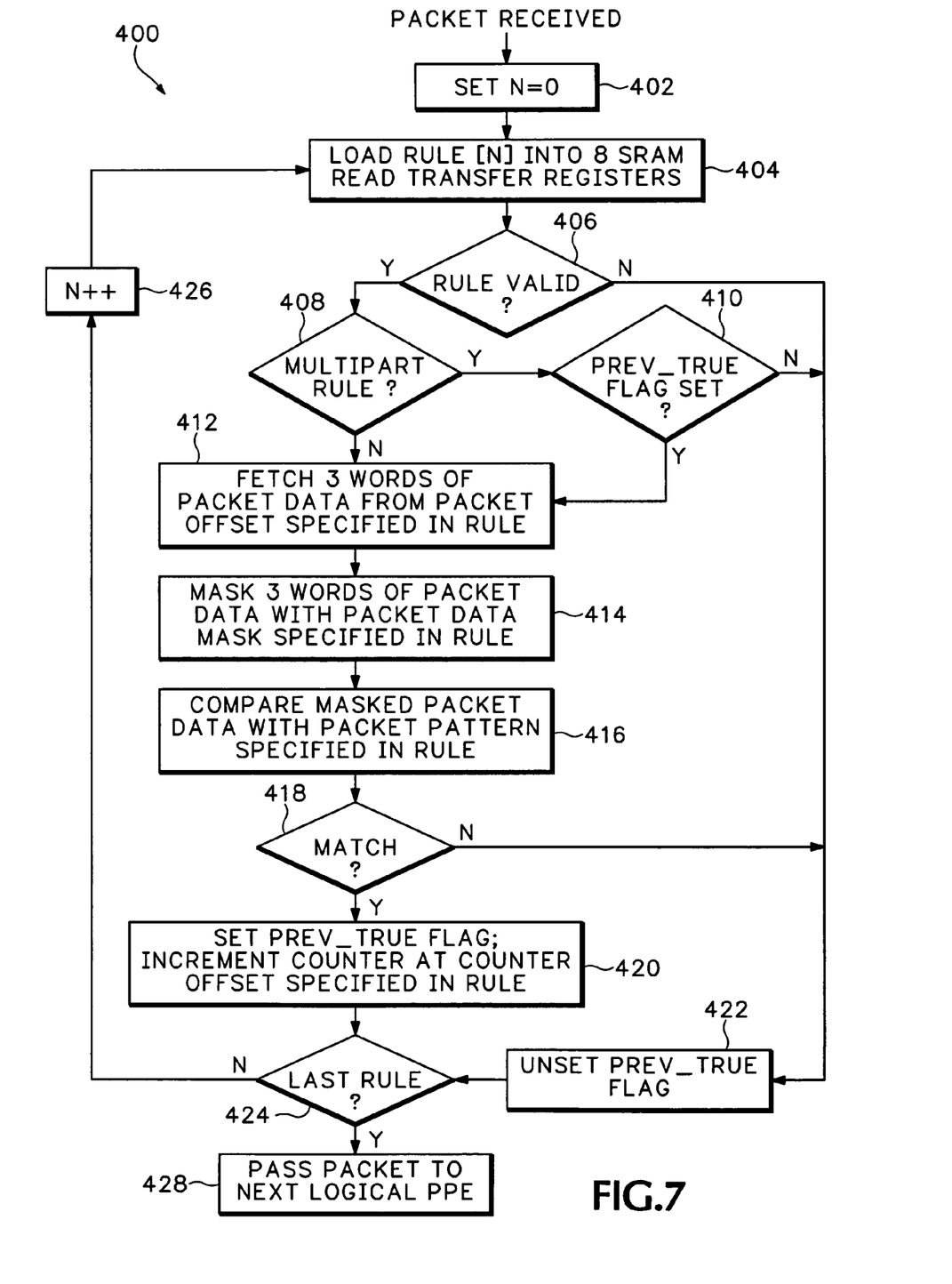
FIG. 7 contains a flowchart for rule processing according to an embodiment of the invention.

FIG. 6 shows a more specific packet rule format 350 for the packet-processing engine (PPE) illustrated in FIG. 3, and FIG. 7 contains a flowchart 400 for processing rules in the format of FIG. 6. As the SRAM transfer registers 160 and 164 and SRAM unit 100 support eight-word burst operations, rule format 350 uses an eight-word (32 bits/word) format. In format 350, word 0 contains the packet offset (in octets) that will be used to load the appropriate data segment in the current packet. Words 1 to 3 contain a packet data mask to be applied to the loaded packet data segment. Words 4 to 6 contain a packet data pattern to be matched with the masked packet data segment. Word 7 contains action codes—in this embodiment, a 30-bit counter offset that specifies the counter to be incremented, a one-bit valid flag, and a one-bit multipart flag are illustrated.

FIG. 7 illustrates one execution flowchart 400 using rule format 350. When this execution thread receives a handle to a new packet, processing begins at block 402. It is noted that the execution thread is assumed to have loaded the counter table start location that has been assigned in the scratchpad memory, and the rule table start location that has been assigned in SRAM memory. Thus at block 402, a rule counter N can be initialized as shown, or else a rule address variable can be set directly to the rule table start location. At block 404, an eight-word burst request to the SRAM unit is issued, requesting that rule[N] be loaded to the eight SRAM read transfer registers assigned to the execution thread.

After the rule is loaded, decision block 406 checks the rule's valid flag before continuing with processing of that rule. When the rule is not valid, the rule is skipped and processing continues at block 422. Otherwise, control passes to decision block 408, which checks the rule's multipart flag. When the multipart flag is set, control passes to decision block 410, which checks whether the PREV_TRUE flag was set during execution of an immediately preceding rule. When the PREV_TRUE flag is not set, indicating that no match was found under the preceding rule, processing for the current rule is skipped and control passes to block 422. Otherwise (and also when the multipart flag is not set), block 412 loads the packet offset specified in the rule, calculates the correct SDRAM address to the desired segment of the packet using the packet offset and the packet handle, and a three-word burst request to the SDRAM unit is issued.

Once block 412 loads the packet data, block 414 masks the packet data using the three-word packet data mask from the current rule. Block 416 then compares the masked data with the three-word packet data pattern specified in the current rule. Decision block 418 branches to either block 420 or block 422, depending on the result of the comparison. When the comparison evaluates false, control passes to block 422, which unsets the PREV_TRUE flag in preparation for the next rule. When the comparison evaluates true, block 420 sets the PREV_TRUE flag in preparation for the next rule. Also, block 420 calculates a counter address using the rule's counter offset and the counter table start location in the scratchpad memory, and then increments the counter at that address. In this embodiment, the scratchpad memory supports an atomic increment operation, such that one processor thread can increment a counter in a manner that blocks other processors and threads from simultaneously incrementing the same counter.

Blocks 420 and 422 both transition to block 424. Block 424 branches to one of two places, depending on whether or not this is the last rule in the packet rule set. The last rule can be determined, for example, by reading a value stored in memory indicating the address of the last rule, reading a value stored in memory indicating the number of rules in the set and comparing this to the number of rules processed, or examining an additional "last rule" flag stored in a field within each rule (not shown in FIG. 6). If block 424 determines that the last rule has been processed, control is passed to block 428 where the handle for the packet is passed to the next logical PPE. When more rules remain, block 424 passes control to block 426, which increments the rule counter (or increments a rule pointer by the rule size).

FIG. 7 represents major functions in an exemplary rule processing flow, but is not optimized or representative of every possible situation that may arise in a particular implementation. For instance, some rules may have offsets that are larger than the entire length of a packet of interest, thus an implementation may check the offset against the packet length and skip rules that look beyond the end of the current packet. In some implementations, the rules may be sortable by packet offset, such that when one offset is encountered with a value that is larger than the packet, all further rules can be skipped.

Other optimizations may operate speculatively, for example, the request for three words of packet data could be launched even before flags are explained, and/or the request to load the next rule could be launched before all processing of the current rule is complete. Multiple flags may be checked simultaneously, such that individual flag checking only becomes necessary when the multiple-flag check shows a deviation from a defined "normal" flag condition. The field order in the packet rule format may also be altered if it is desirable to have some portions of the rule available first.

Action codes may also operate to jump processing from one part of the rule set to another. One possible implementation places part of the rule set in Content-Addressable Memory (CAM). For instance, packet offsets and masked contents for values unique to various common packet types, e.g., TCP, UDP (User Datagram Protocol), ARP (Address Resolution Protocol), HTTP, FTP (File Transfer Protocol), RTP (Realtime Transport Protocol), etc., can be placed in a ternary CAM. A PPE execution thread extracts header segments at specified packet offsets, and feeds the packet offsets and header segments directly to the CAM. A packet of one of the listed types will generate a CAM hit, resulting in an address that can be translated into a pointer to a segment of a packet rule table such as shown in FIG. 5. Thus depending on packet type, a different set of packet rules can be processed that are specific to that packet type.

A similar effect can be created with rule-level flags. For instance, top-level rules can have a rule-level flag set, and all rules between two top-level-flagged rules depend on the previous top-level rule evaluating true.

Returning momentarily to FIG. 4, in one embodiment the following functions are executed by core processor 90. When the system is initialized, core processor 90 allocates space in SRAM 60 for packet rule set 62 and allocates space in scratchpad memory 124 for counter table 202. Core processor 90 patches the packet rule set start address and counter table start address to the packet processing engines.

The core processor interface with client 210 accepts rule requests from client 210 and associates rule IDs (identifications) with each rule request. The core processor may, for example, maintain a translation table between rule IDs and rules as located in packet rule set 62, to effect communication with client 210. For each rule request, one or more packet rules are generated. Core processor 90 selects an unused counter in counter table 202 and writes that counter's offset into the packet rule, along with the packet offset and pattern data supplied by the client and any appropriate flags.

Core processor 90 may perform other packet rule processing functions as well. In some embodiments, it may be advantageous for the packet rule set to be in a specific order, for example, by packet offset and/or in a multipart dependency order. Core processor 90 creates this order, and can rearrange the packet rule set when new rules arrive or existing rules are removed.

Core processor 90 may also format rules to match the particular data format of the PPE packet rule set. For instance, client 210 can be allowed to request packet matches for data segments of arbitrary length, while the actual rules require fixed-length data patterns. When a rule request provides a data pattern that is shorter than the fixed length, core processor 90 pads the packet data pattern up to the fixed length, pads the pattern data mask to mask the padded portion of the packet data pattern, and writes the padded values to the packet rule. When a rule request provides a data pattern that is longer than the fixed length, core processor 90 divides the provided data pattern into multiple patterns to be placed in multiple packet rules, each no larger than the fixed length, and generates offsets for the latter roles. Multipart rule flags are then used to link the multiple packet rules together during processing by a PPE thread.

Core processor 90 also provides counter table statistics retrieval functionality. This includes the capability to read a counter associated with a particular rule request ID, report the counter value to client 210, and possibly reset the counter. Core processor 90 may be configured to respond to requests for individual rule IDs, or to respond to requests for complete table dumps. Optionally, an ability to service statistics requests for reports at preset intervals could also be configured as a feature of the core processor.

The described functionality, although in some embodiments leveraging hardware optimizations, may all be implemented using computer instructions that are stored on computer-readable media, such as bootROM 70 shown in FIG. 1, media accessible to client 210 in FIG. 4, and/or a removable flash memory card accessible to network processor 30. Generally, the computer instructions include core (e.g., control-phase) instructions and PPE (e.g., data-phase) instructions. The core instructions and PPE instructions typically will not be in the same machine code format, and may or may not be stored in the same media.

Figure 8:
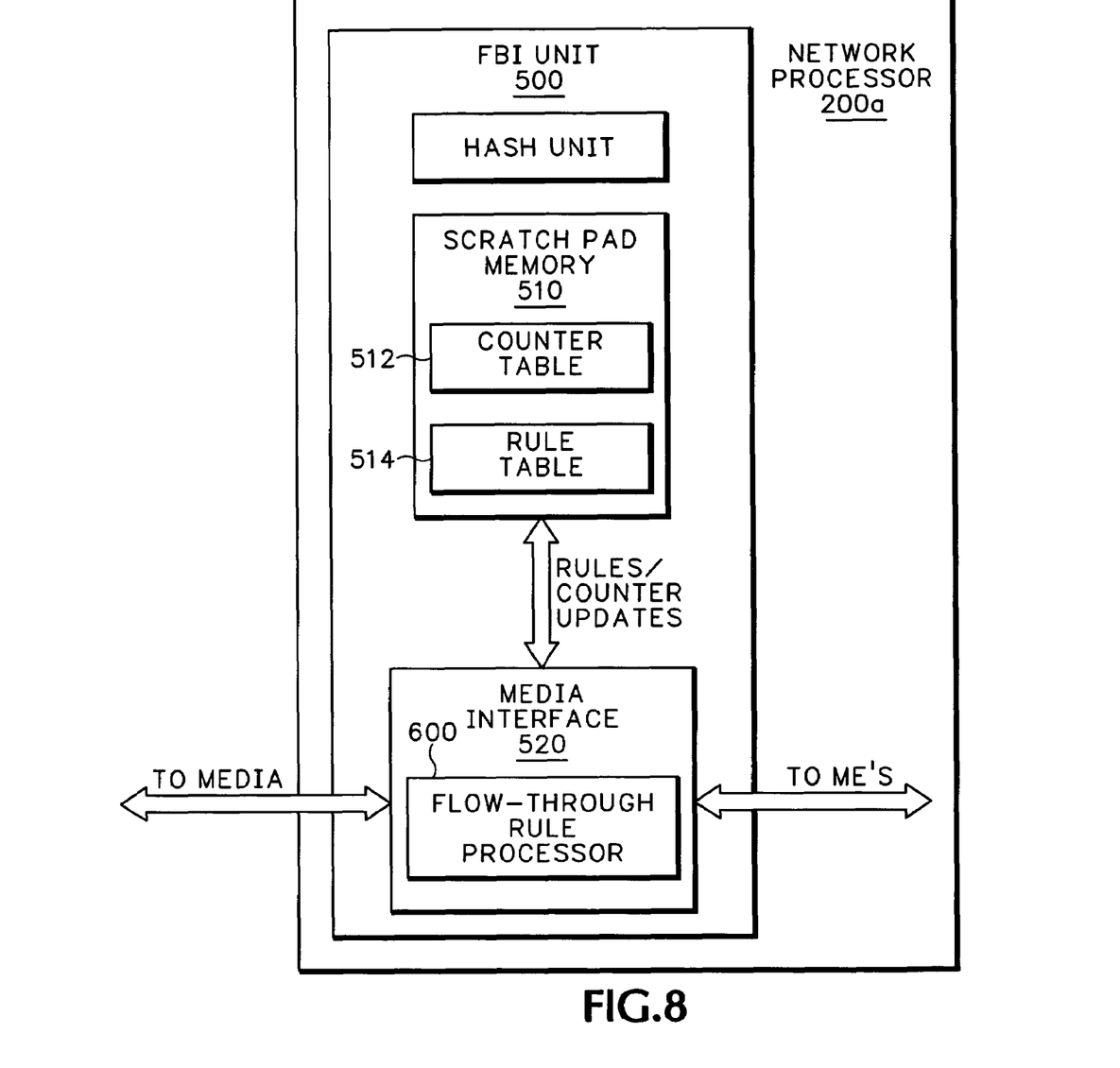
FIG. 8 shows a block diagram for a FBI unit of a network processor incorporating a hardware packet rule processor according to an embodiment of the invention.
Figure 9:
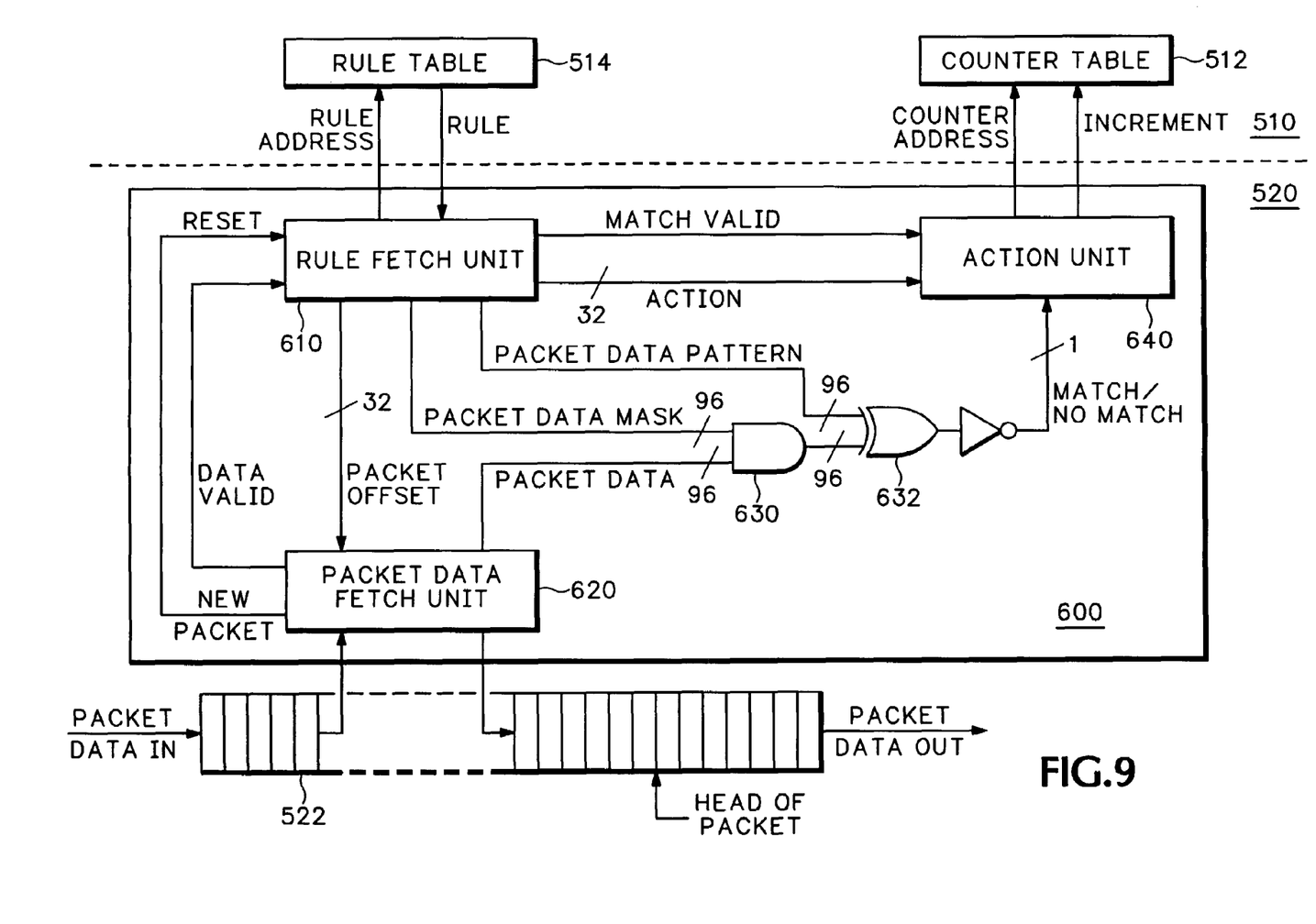
FIG. 9 contains a detailed block diagram illustrating the hardware packet rule processor of FIG. 8.

Many, or all, of the PPE functions can be implemented in hardware in an alternate embodiment, as shown in FIGS. 8 and 9. A network processor 200a in FIG. 8 may be organized similar to previous embodiments, except additional functionality is provided within an FBI unit 500. Instead of embodying statistics collection using a PPE thread, network processor 200a imbeds a flow-through rule processor 600 within a media interface 520, and stores both a counter table 512 and a rule table 514 on a scratchpad memory 510.

FIG. 9 shows a detailed block diagram for rule processor 600 and other cooperating components of FBI unit 500. Rule processor 600 contains a rule fetch unit 610, a packet data fetch unit 620, match circuitry (shown as logic circuits 630 and 632), and an action unit 640. Each will be explained in turn.

Rule fetch unit 610 fetches rules from rule table 514. A rule number (e.g., scratchpad address) is used to load rules in sequence into rule processor 600. Rule fetch unit 610 maintains a pointer to the current rule, which is reset to the head of the rule table when a RESET signal is received from packet data fetch unit 620. Also, when rule fetch unit 610 receives a DATA VALID signal from packet data fetch unit 620, unit 610 can begin to process the next rule from rule table 514. Rule fetch unit distributes rule fields from the current rule to other blocks of rule processor 600: the packet offset to packet data fetch unit 620; the packet data mask to AND circuit 630; the packet data pattern to XOR circuit 632; and the action code to action unit 640. In addition, rule fetch unit provides a MATCH VALID signal to action unit 640 when the DATA VALID signal from the packet data fetch unit 620 is asserted and a valid packet data mask and packet data pattern have been supplied to the match circuitry.

Packet data fetch unit 620 interfaces with a receive packet FIFO 522, an element of media interface 520. When a new head of packet is sensed by packet data fetch unit 620, it resets an internal octet counter to zero, asserts the NEW PACKET signal to reset rule fetch unit 610, and stops octet flow through unit 620 until a first packet offset is received from rule fetch unit 610. When a packet offset is received, this offset is stored and compared against the internal octet counter. The internal octet counter is then allowed to increment as packet data passes through packet data fetch unit 620 until the internal octet counter matches the packet offset. Packet data flow is then stopped, the current packet data in unit 620 is supplied to AND circuit 630, and the DATA VALID signal is asserted to rule fetch unit 610. Packet data fetch unit 620 then stops and waits for a new packet offset.

The match circuitry comprises a mask circuit and a compare circuit. In this simple example, where the entire pattern is evaluated in parallel, the mask circuit comprises an AND circuit 630 that performs 96 parallel bit-wise AND operations with the 96 packet data mask bits and the corresponding 96 packet data bits. The 96 AND results and the 96 packet data pattern bits are supplied to XOR circuit 632, which performs 96 bit-wise XOR operations, ORs the 96 results, and inverts the output to provide a one-bit match/no-match indication to action unit 640.

Action unit 640 enters an active action state when the MATCH VALID and match/no match signals are both asserted. When such a condition occurs, action unit 640 responds to the action supplied by rule fetch unit 610. Typically, this response will involve reading a counter offset and incrementing the counter at that offset within counter table 512. Action unit 640 can also process multipart flags by saving the active/inactive state from the previous match cycle.

It is noted that in this particular hardware embodiment, only a single linear pass through the packet data is allowed because the data is processed inline with an input FIFO. Thus a requirement for correct operation is a rule table organized in order based on packet offset, with the rule having the smallest packet offset appearing first in the rule table. Under this constraint, it may not be possible to place a multipart rule in consecutive rule locations in rule table 514. One possible modification, then, is to store an action in the first rule, from a multirule set, that, when performed, sets or unsets a "success flag" within the second rule of a multirule set in table S14. When the second rule is finally reached, the action unit can examine this flag to determine what action to take based on the success or failure of the match for the first rule.

By having the action unit send an appropriate instruction to the rule fetch unit, jumps within the table can still be made. Such jumps would also be subject to the constraint of increasing packet offset.

Many other optimizations are possible. To speed processing, rule fetch unit may look ahead and pre-load one or more upcoming rules (or at least the packet offsets) into a local register buffer. The match circuitry need not be capable of processing all bits of a rule pattern in parallel, but could perform the match in smaller units over several clocks, with appropriate synchronization between units 610 and 620.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, in a multi-threaded and/or multiple processor system, different threads can process different sections of the packet rule set—and complex actions taken in response to a rule may execute as a separate thread. Many other actions, besides those described herein, could be coded into a rule. Although specific data structures are shown herein in specific memory types suited to those data structures, embodiments that make different use of SRAM, SDRAM, CAM, scratchpad, register, and/or some other type of memory, appropriate for the application, are certainly possible. Some of the functionality described for the core processor may be implemented on a client, with low-level support provided by the core processor. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a network processor, the method comprising:
   writing, to a shared memory accessible by multiple packet processing engines, a dynamic packet rule set, each rule specifying a packet offset, a data pattern, and an action code;
   writing, to an instruction store for the packet processing engines, execution instructions referencing the dynamic packet rule set; and
   on at least one of the packet processing engines, while processing a packet and in response to the execution instructions, loading a first packet rule from the dynamic packet rule set, comparing packet data at the packet offset specified in the first packet rule to the data pattern specified in the first packet rule, and, when the comparison indicates a match, performing an action indicated by the action code specified in the first packet rule,
   wherein performing the action comprises incrementing a counter specified in the first packet rule, wherein the counter is located in a local memory area accessible by each packet processing engine, and wherein incrementing the counter comprises blocking other processors from accessing the counter during the increment.

2. The method of claim 1, wherein the data pattern in each rule comprises a mask and a bit pattern, and wherein comparing packet data to the data pattern comprises masking the packet data using the mask, and comparing the masked packet data to the bit pattern.

3. The method of claim 2, wherein the shared memory comprises a content-addressable memory (CAM), wherein the data pattern for at least some rules are stored in the CAM, and wherein masking the packet data and comparing the masked packet data to the bit pattern are performed by the CAM for data patterns stored in the CAM.

4. The method of claim 1, wherein performing the action comprises loading a second packet rule specified in the first packet rule.

5. The method of claim 1, further comprising, while processing the packet, loading additional packet rules from the dynamic packet rule set, and repeating the processing performed for the first packet rule for each of the additional rules.

6. The method of claim 1, wherein each rule in the dynamic packet rule set comprises a rule valid field, the method further comprising checking the rule valid field prior to performing the action.

7. The method of claim 1, wherein writing the dynamic packet rule set comprises arranging the rules in the set in order based on packet offset, with the rule having the smallest packet offset appearing first in the set.

8. An integrated circuit comprising:
   a local memory to store a rule table, the rule table organized with entries comprising a packet offset, a data pattern, and an action;
   a packet data queue to receive packet data;
   a rule fetch unit to fetch rules from the rule table;
   a packet data fetch unit to fetch a segment of packet data from the packet data queue, based on the packet offset fetched by the rule fetch unit;
   match circuitry to compare the packet data segment fetched by the packet data fetch unit with the data pattern fetched by the rule fetch unit;
   an action unit to perform the action fetched by the rule fetch unit when the match circuitry indicates a match between the compared packet data segment and data pattern; and
   the local memory also to store a counter table, wherein the action in a rule table entry comprises an index into the counter table, the action unit responding to the counter table index and a match indicated by the match circuitry by incrementing an entry in the counter table referenced by the counter table index.

9. The integrated circuit of claim 8, wherein the data pattern in each rule table entry comprises a mask and a bit pattern, the match circuitry comprising:
   mask circuitry to apply the mask in the fetched data pattern to the fetched packet data segment; and
   compare circuitry to compare the masked packet data segment to the bit pattern in the fetched data pattern.

10. The integrated circuit of claim 8, wherein the action in a rule table entry comprises an index to a second rule table entry, the action unit responding to the rule table entry index and a match indicated by the match circuitry by setting a success flag in the second rule table entry.

11. The integrated circuit of claim 8, wherein each rule table entry comprises a rule valid field, the rule fetch unit reading the rule valid field on a fetched rule to determine whether to process the rule.

12. The integrated circuit of claim 11, wherein one possible value of the rule valid field indicates an end of the rule table, the rule fetch unit resetting to the head of the rule table after fetching a rule wherein the rule valid field indicates the end of the rule table.

13. A method of gathering statistics on packets received by a network processor, the method comprising:
   configuring a core processor to dynamically accept packet rule requests and place corresponding packet rules in a packet rule set area at a first memory region in an addressable memory space, at least one rule in the packet rule set specifying a packet offset, a data pattern, and a counter offset;
   configuring a set of packet processing engines to sequence through the packet rule set, retrieving one of the packet rules from the first memory region and comparing packet data from a received packet, at the offset specified in the retrieved packet rule, to the data pattern specified in the retrieved packet rule, and, when the comparison evaluates true, incrementing a counter, at the counter offset specified in the retrieved packet rule, within a second memory region in the addressable memory space; and
   configuring the core processor to retrieve statistics from the counters in the second memory region.

14. The method of claim 13, wherein configuring the core processor to dynamically accept packet rule requests comprises configuring the core processor to allocate a counter offset in response to a packet rule request.

15. The method of claim 13, further comprising the core processor arranging the rules in the packet rule set area in an order based on packet offset, with the rule having the smallest packet offset appearing first in the set.

16. The method of claim 13, wherein configuring the core processor to retrieve statistics comprises loading a control plane process allowing a remote administrator to request and receive periodic statistics reports from the core processor for the rules in the packet rule set.

17. The method of claim 13, wherein each rule has a fixed-length data pattern, the method further comprising configuring the core processor to pad a requested data pattern in a packet rule request up to the fixed length when the requested data pattern is shorter than the fixed length, and mask the padded portion of the data pattern.

18. The method of claim 13, wherein each rule has a fixed-length data pattern, the method further comprising:

configuring the core processor to divide a requested data pattern in a packet rule request into multiple data patterns no larger than the fixed length when the requested data pattern is longer than the fixed length, and place the multiple data patterns in corresponding multiple packet rules, the first of the multiple packet rules referencing the second or vice-versa; and configuring the set of packet processing engines to fully process the second of the multiple packet rules only when processing the first of the multiple packet rules results in a comparison evaluating true.

19. An article of manufacture comprising computer-readable media containing instructions that, when executed by a network processor, cause that network processor to perform a method comprising:

dynamically accepting packet rule requests at a core processor and placing corresponding packet rules in a packet rule set area at a first memory region in an addressable memory space, at least one rule in the packet rule set specifying a packet offset, a data pattern, and a counter offset;

sequencing through the packet rule set with a set of packet processing engines, retrieving one of the packet rules from the first memory region and comparing packet data from a received packet, at the offset specified in the retrieved packet rule, to the data pattern specified in the retrieved packet rule, and, when the comparison evaluates true, incrementing a counter, at the counter offset specified in the retrieved packet rule, within a second memory region in the addressable memory space; and the core processor retrieving statistics from the counters in the second memory region for distribution outside of the network processor.

20. The article of manufacture of claim 19, wherein the method further comprises the core processor arranging the rules in the packet rule set area in an order based on packet offset, with the rule having the smallest packet offset appearing first in the set.

21. The article of manufacture of claim 19, wherein the core processor retrieving statistics comprises communicating with a remote administrator, allowing the remote administrator to request and receive periodic statistics reports from the core processor for the rules in the packet rule set.

22. The article of manufacture of claim 19, wherein each rule has a fixed-length data pattern, the method further comprising the core processor padding a requested data pattern in a packet rule request up to the fixed length, and masking the padded portion of the padded data pattern, when the requested data pattern is shorter than the fixed length.

23. The article of manufacture of claim 19, wherein each rule has a fixed-length data pattern, the method further comprising:

the core processor dividing a data pattern in a packet rule request into multiple data patterns no larger than the fixed length when the requested data pattern is shorter than the fixed length, and placing the multiple data patterns in corresponding multiple packet rules, the first of the multiple packet rules referencing the second or vice-versa; and the set of packet processing engines fully processing the second of the multiple packet rules only when processing the first of the multiple packet rules results in a comparison evaluating true.

* * * * *